United States Patent [19]

Hellström et al.

[11] Patent Number: 5,188,814
[45] Date of Patent: Feb. 23, 1993

[54] METHOD OF BLEACHING

[75] Inventors: Pia Hellström, Lilla Edet; Ivan Dalin, Kungälv, both of Sweden; Steen Linderström-Lang, Lyngby, Denmark

[73] Assignees: Eka Nobel AB, Bohus, Sweden; Faxe Kalk, Köpenhamn, Denmark

[21] Appl. No.: 783,146

[22] Filed: Oct. 28, 1991

[30] Foreign Application Priority Data

Oct. 29, 1990 [SE] Sweden ............................... 9003440

[51] Int. Cl.$^5$ ........................ C01G 21/14; C09C 1/02
[52] U.S. Cl. ................................... 423/430; 423/173; 106/464
[58] Field of Search ............... 423/430, 437, 438, 173, 423/174, 175, 176; 106/464

[56] References Cited

U.S. PATENT DOCUMENTS

| 3,333,919 | 8/1967 | Buckingham | 423/430 |
| 4,572,825 | 2/1986 | Sebb et al. | 423/173 |
| 4,793,985 | 12/1988 | Price et al. | 423/430 |
| 4,935,391 | 6/1990 | Caropreso et al. | 106/488 |
| 5,084,254 | 1/1992 | Golley | 423/430 |

FOREIGN PATENT DOCUMENTS

| 0176443 | 4/1986 | European Pat. Off. | |
| 3122218 | 12/1982 | Fed. Rep. of Germany | |
| 303003 | 8/1968 | Sweden | |
| 733418 | 6/1955 | United Kingdom | 423/173 |
| 1069276 | 5/1967 | United Kingdom | 423/430 |
| 1264190 | 2/1972 | United Kingdom | |
| 2032901 | 5/1980 | United Kingdom | |

Primary Examiner—Gary P. Straub
Attorney, Agent, or Firm—Burns, Doane, Swecker & Mathis

[57] ABSTRACT

The invention concerns a method of bleaching particles containing calcium carbonate by keeping them in contact with an aqueous solution containing hydrogen peroxide and having a pH-value below 8.

12 Claims, No Drawings

METHOD OF BLEACHING

The invention concerns a method of bleaching particles containing calcium carbonate by keeping them in contact with an aqueous solution containing hydrogen peroxide and having a pH-value below 8.

Particles to a great extent consisting of calcium carbonate, have extensive use as fillers and coatings, for example in papermaking. Particles of chalk are frequently used, which particles substantially consist of shell-remainders from marine life and often contain from 90 to 100% by weight of calcium carbonate. For some applications, the requirement of brightness is so high that the particles must be bleached prior to use, which bleaching today often is performed by chlorine-based bleaching agents. Thereby, there is a risk for the formation of chlorinated pollutants, often being unpleasant, to handle and in an environmental point of view.

It is well known to use hydrogen peroxide for bleaching of for example cellulose fibres or in connection with washing of textiles.

From DE, A1, 3122218 it is known that the brightness of chalk can be increased by suspending pulverized material in an alkaline solution containing dispersing agents and hydrogen peroxide. Thereby a foam forms, which foam will contain dark particles which can be removed with the foam. The publication thus concerns a method of physical removing dark particles from chalk, which method requires proportionally complicated equipment and supply of for example dispersing agents.

From GB 1264190 it is known to bleach kaolin with hydrogen peroxide at a pH of 5.5 which is within the range of the natural pH-value of a kaolin-slurry. Any further acidifying is thus not necessary.

SE patent 303003 discloses bleaching of chalk with hydrogen peroxide in alkaline solution, for example at pH 10. It is advised not to treat chalk in an acidic medium.

EP patent 176443 mentions that chalk can be bleached with hydrogen peroxide, but fails to specify any suitable pH value.

It is an object of the invention to provide a simple method for bleaching of particles containing calcium carbonate, especially particles which to more than about 50% by weight, preferably to more than 80% by weight, consist of calcium carbonate, for example particles substantially consisting of chalk, which method gives excellent result without supply of chloride-compounds or organic substances such as dispersing agents. The object has been found possible to achieve with the invention according to claim 1. More specifically, the invention concerns a method of bleaching particles containing calcium carbonate by keeping them in contact with an aqueous solution containing hydrogen peroxide and having a pH-value below 8, preferably below 7. It has been found that the bleaching is improved with increasing acidity of the aqueous solution, but at too low pH-values there is a risk that too much of the calcium carbonate dissolves. The pH of the solution should therefore be above about 6.5. Since the calcium carbonate as such gives an alkaline aqueous solution, the addition of an acid is generally required, such as for example sulfuric acid, hydrochloric acid, nitric acid or acetic acid.

It has also been found that the bleaching is improved with increasing temperature. Suitably, the particles and the aqueous solution containing hydrogen peroxide is held at a temperature exceeding about 95° C., preferably exceeding about 100° C., most preferably exceeding about 110° C. Temperatures exceeding about 150° C. gives no further improvement, for which reason, in an economic point of view, suitable temperature is from about 95 to about 150° C., preferably from about 100° to about 130° C., most preferably from about 110° to about 130° C. In order to enable such high temperatures, the bleaching should be performed at a pressure exceeding the saturation pressure of the water vapour at the actual temperature. Increased pressure as such also gives improved bleaching effect, but for economic reasons it should not be too high. For example, the bleaching may be performed at a pressure up to about 25 bars.

The reaction time should be long enough for obtaining desired bleaching. Reaction time here refers to the time from when the particles are in contact with the aqueous solution, the solution having suitable pH, temperature and content of hydrogen peroxide, until any of the above conditions no longer is satisfied. The endpoint may for example occur when it is run out of hydrogen peroxide which is consumed during the reaction, or if the particles are separated from the solution before that happens. In practice, it is often advantageous to let the reaction go on until all hydrogen peroxide is consumed, and then separate the particles from the liquid phase in a suitable way, for example by sedimentation, centrifugation, filtering or evaporation, and finally optionally drying them. In some applications it also possible to use the bleached slurry as such, in which case no total separation is required. Suitable reaction time depends, among other things, on the desired result of the bleaching, on the dosage of hydrogen peroxide and on the temperature. Generally the time is from about 5 to about 180 minutes, preferably from about 10 to about 90 minutes, most preferably from about 15 to about 60 minutes.

As mentioned above, the hydrogen peroxide is consumed during the reaction. It is suitable to supply the hydrogen peroxide in an amount so that the aqueous solution, at the start of the bleaching, contains hydrogen peroxide in an amount enough for obtaining bleaching at the actual acidity and temperature. Generally, suitable content at the start of the bleaching is from about 0.2 to about 25 grams hydrogen peroxide per liter solution. Excess supply of hydrogen peroxide causes no harm but does however not give any further improved bleaching. In order to keep the concentration as constant as possible, the hydrogen peroxide can be added continuously or stepwise at two or more occasions during the reaction. Hydrogen peroxide can be supplied in the form of an aqueous solution, suitably having a concentration from 1 to 90% by weight, preferably from 35-70% by weight, but can also be supplied in the form of one or more hydrogen peroxide generating substances, such as perborates or percarbonates, preferably of alkali metals.

Suitably, the particles are in contact with the solution containing hydrogen peroxide in the form of a slurry, preferably having a dry content from about 10 to about 45% by weight. If the dry content is too high, the slurry becomes too viscous and difficult to handle, and if it is too low, the consumption of hydrogen peroxide required for keeping suitable concentration in the aqueous solution becomes unnecessarily high. If dispersing agents are added, such as CMC, polyacrylate or phosphorous compounds, the bleaching can be performed at dry contents up to about 75% by weight. If the dry content of the slurry is from about 10 to about 45% by weight, it is generally suitable to supply the hydrogen peroxide in a total amount from about 0.5 to about 50 kg, preferably from about 1 to about 30 kg, most preferably from about 5 to about 15 kg hydrogen peroxide per tonne dry particles during the bleaching. It is also possible to add substances acting stabilizing on hydrogen peroxide, such as phosphonic acids.

The particles may be brought into contact with the solution containing hydrogen peroxide by any method, batchwise as well as continuously. A preferred method involves suspending the particles in water to a slurry having suitable dry content, adding an acid to suitable pH, temperating, and then adding hydrogen peroxide or a hydrogen peroxide generating substance in an amount enough for obtaining bleaching, optionally continuously or stepwise during the reaction. It is also possible to let the water the particles are to be suspended in already contain a suitable amount of acid or to let it have suitable temperature. The suitable temperature and acidity are then maintained during the whole reaction time, optionally by supplying an acid or a base. When the particles have been enough bleached, which often also means that all hydrogen peroxide supplied has been consumed, they can be separated from the slurry and optionally dried. If the bleaching is performed batchwise, the pH-regulated slurry is suitably transferred to a vessel in which it is temperated, supplied with hydrogen peroxide and is allowed to stand for the whole reaction time, preferably under agitation. If the bleaching is performed continuously, it is preferred to let a pH-regulated slurry flow through a tube-reactor having one, two or more dosing points for hydrogen peroxide. The length of the reactor and the velocity of the slurry should be adjusted so that the average residence time of the slurry corresponds to the suitable reaction time.

The particle size is not critical for the invention, and depends completely on the desired use of the bleached product. For example, particles having a size from about 0.1 μm or smaller and up to about 5 mm or more may be bleached. The method according to the invention has, among other things, been found to be very useful for bleaching of pulverized chalk having a particle size from about 0.1 μm to about 100 μm.

The invention is now to be illustrated through the following examples which are not intended to limit the invention. Even if the examples concern bleaching of chalk, it is obvious to a person skilled in the art that the method according to the invention also can be applied for bleaching of other particles to a great extent consisting of calcium carbonate. If not otherwise stated, all contents mentioned refer to % by weight.

EXAMPLE 1

Powder of chalk, 100% of the particles being smaller than 40 μm and 96% of the particles being smaller than 10 μm, the content of calcium carbonate being 98% by weight, showed a brightness of 80.4% at 457 nm according to SCAN P.49.81. 300 g dry powder of chalk was suspended in 700 g water, whereby a slurry having a dry content of 30% was obtained. 15 ml 2 molar sulfuric acid was added, the ph-value of the slurry becoming 6.5. The slurry was transferred to a 2 liters mantled reaction vessel and was temperated to 120° C. Then 7.2 g 50% hydrogen peroxide was added, whereby the initial hydrogen peroxide content of the aqueous solution was 5 g/l. The total consumption of hydrogen peroxide was thus 12 kg per tonne dry chalk. The slurry was allowed to stand under agitation in the reaction vessel for 30 minutes while the temperature was kept constant at 120°±2° C., whereupon the chalk was filtered off in a Bucher-funnel and dried. The brightness was determined to 84% according to the same method as used for the unbleached chalk. Iodometric titration of the filtrate showed that no hydrogen peroxide remained.

EXAMPLE 2

Chalk having the same constitution and brightness as in example 1 was bleached in the same way, with the exceptions that only half the amount of hydrogen peroxide was added initially, while the rest was added after 20 minutes, and that the total reaction time was 40 minutes, after which time no hydrogen peroxide remained. The consumption of hydrogen peroxide was thus the same as in example 1, but the initial content in the aqueous solution was only about 2.5 g/l. The bleached and dried chalk showed a brightness of 84.5%.

EXAMPLE 3

Chalk having the same constitution and brightness as in example 1 was bleached at different pH-values. The bleaching was performed in the same way as in example 1 with the following exceptions: The temperature was 75° C., the reaction time was 60 minutes and the supply of hydrogen peroxide was 20 kg per tonne dry chalk. The bleaching results appear from the following table.

| pH | Brightness (%) |
| --- | --- |
| 7 | 83.2 |
| 8 | 82.6 |
| 9 | 82.3 |
| 10 | 81.4 |

We claim:

1. A method for bleaching a composition containing calcium carbonate, comprising contacting the composition with an aqueous solution containing hydrogen peroxide and at an initial pH of above about 6.5 and below 8 said contacting step having a length of time sufficient for bleaching the calcium carbonate in said composition.

2. A method as claimed in claim 1, wherein the aqueous solution is maintained at a temperature of greater than about 95° C. during said contacting step.

3. A method as claimed in claim 1, wherein the aqueous solution is maintained at a temperature of from about 95° C. to about 150° C.

4. A method as claimed in claim 1, wherein the aqueous solution has a hydrogen peroxide concentration of from about 0.2 to about 25 grams per liter at the start of the contacting step.

5. A method as claimed in claim 1, wherein the total amount of hydrogen peroxide supplied is from about 0.5 to about 50 kg per ton of composition on a dry weight basis.

6. A method as claimed in claim 1, wherein the aqueous solution contacts the composition during the contacting step for a period of from about 5 to about 180 minutes.

7. A method as claimed in claim 4, wherein the aqueous solution contacts the composition during the contacting step for a period of from about 5 to about 180 minutes.

8. A method as claimed in claim 1, wherein the composition is in the form of particles, and wherein the aqueous solution and said particles form a slurry during said contacting step.

9. A method as claimed in claim 4, wherein the composition is in the form of particles, and wherein the aqueous solution and said particles form a slurry during said contacting step.

10. A method as claimed in claim 7, wherein the composition is in the form of particles, and wherein the aqueous solution and said particles form a slurry during said contacting step.

11. A method as claimed in claim 1, wherein the composition contains more than 50% by weight calcium carbonate.

12. A method as claimed in claim 1, wherein the composition comprises chalk.

* * * * *